US007664271B2

(12) United States Patent
Suzaki et al.

(10) Patent No.: US 7,664,271 B2
(45) Date of Patent: Feb. 16, 2010

(54) METHOD AND APPARATUS FOR PROCESSING SOUND SIGNAL

(75) Inventors: Masao Suzaki, Tokyo-to (JP); Yoshinori Katou, Kamifukuoka (JP)

(73) Assignee: New Japan Radio Co., Ltd. (JP)

( * ) Notice: Subject to any disclaimer, the term of this patent is extended or adjusted under 35 U.S.C. 154(b) by 887 days.

(21) Appl. No.: 11/191,949

(22) Filed: Jul. 29, 2005

(65) Prior Publication Data

US 2006/0023889 A1 Feb. 2, 2006

(30) Foreign Application Priority Data

Jul. 29, 2004 (JP) ............................ 2004-222393

(51) Int. Cl.
*H04H 40/54* (2008.01)
*H04R 5/00* (2006.01)
*G06F 17/00* (2006.01)

(52) U.S. Cl. .............................. 381/10; 381/1; 381/17; 381/18; 381/19; 381/20; 381/21; 381/22; 700/94

(58) Field of Classification Search ..................... 381/1, 381/10, 17–23, 61, 302–309; 700/94
See application file for complete search history.

(56) References Cited

U.S. PATENT DOCUMENTS 5,892,830 A * 4/1999 Klayman ....................... 381/1

FOREIGN PATENT DOCUMENTS

JP 2002-354595 12/2002
JP 2002354595 A * 12/2002

* cited by examiner

*Primary Examiner*—Devona E Faulk
(74) *Attorney, Agent, or Firm*—Antonelli, Terry, Stout & Kraus, LLP.

(57) ABSTRACT

A method for processing sound signal including an L side enhanced difference signal comprising a sum of a signal being removed low frequency component from L−R signal and an L+R signal, an R side enhanced difference signal comprising a sum of a signal being removed low frequency component from R−L signal and an R+L signal, an L side output signal comprising a subtraction of signals, in which said R side enhanced difference signal being delayed to remove low and high ranges and amplified by a predetermined amplifying rate for a purpose of cross cancellation talk is subtracted from said L side enhanced difference signal and an R side output signal comprising a subtraction of signals, in which said L side enhanced difference signal being delayed to remove low and high ranges and amplified by a predetermined amplifying rate for a purpose of cross cancellation talk is subtracted from said R side enhanced difference signal.

3 Claims, 2 Drawing Sheets

METHOD AND APPARATUS FOR PROCESSING SOUND SIGNAL

BACKGROUND OF THE INVENTION

The present invention relates to an art of amplifying a stereo sound image by two speakers through inputting stereo signal of two channels, an L signal (left signal) and R signal (right signal). More particularly, the present invention relates to a method and apparatus for processing a sound signal whose sound image is normally localized outside of two speakers through especially enhancing a difference signal between the L signal and R signal and adding a crosstalk cancellation process of short delay time.

Audio frequencies in which a person can hear are concentrated around 300 Hz to 3.5 kHz, and an audio frequency which is important for clear conversations is 1 kHz and its wavelength is 30 cm. Accordingly, for example, when a sound arrives from a left side direction of a head, the sound arrives as an inverse phase to a right ear from a left ear, since the right ear is positioned approximately 15 cm apart from left ear. Therefore, when a same sound arrives from left and right sides, a listener feels that the sound image is located in front of the listener.

However, since an L−R signal generates phase modulation and a volume difference against the R signal, a sound image of the L−R signal around 1 kHz is localized to the left side within a range of left 180 degrees, and a person feels the sound image arrives from direct left side. Also, since an R−L signal generates phase modulation and a volume difference against the L signal, a sound image of the R−L signal around 1 kHz is localized to the right side within a range of right 180 degrees, and a person feels the sound image arrives from direct right side.

FIG. 2 shows a conventional surround reproduction circuit (for example, see Japanese Unexamined Patent Publication No. 354595/2002). An L side surround signal, which is the L−R signal, is generated by an adder 35 through the L signal and R signal of a stereo being inputted from input terminals 31 and 32. The L−R signal, which is mainly a composition of high frequency of small vocal and echo sound, is inputted into a low-pass filter 36 and removes a harsh signal component, and then volume to be added to an original signal is adjusted by an operational amplifier 37. Then, the surround effect is obtained through adding the L−R signal component to the original L signal as an L side surround signal through an adder 38 and adding the R−L component signal to the original R signal as an R side surround signal through an adder 39, then the surround signal is outputted through output terminals 42 and 43. Numerals 33, 34, 40 and 41 are buffers.

As mentioned above, surround effect has been obtained through enhanced phase modulation and volume difference by removing sound signal component, which is enhanced by an ear and whose sense of direction is easily recognized by a person. Then, reverberation sound and reflected sound, which locate in a frequency band where the sense of direction is hard to be recognized, are enhanced and mixed with the L signal and R signal.

Since the surround reproduction circuit of a conventional art has been enhanced the L−R difference signal component, a sound signal, which is received in an ear, is not only a signal from one speaker but it is a result of the sum of signals from two speakers. Accordingly, there has been a problem that even if there is a sense of spread, the localized position becomes unclear since a phase frequency characteristic is disturbed at the ear.

SUMMARY OF THE INVENTION

An object of the present invention is to provide a method and apparatus for sound signal process, which clarifies a sound image localization and reduces disturbance of a phase frequency characteristic, and the sound image is clearly sensed at localized position at outside of the speaker even if the space between the two speakers is narrow.

A method for processing sound signal according to the present invention comprises including an L side enhanced difference signal including a sum of signals, in which one of the signals is generated through subtracting an R side input signal being amplified by a predetermined amplifying rate from an L side input signal then removing high frequency component from the remainder, and the other signal is generated through adding the above-mentioned R signal being amplified by a predetermined amplifying rate to above-mentioned L side input signal, an R side enhanced difference signal including a sum of signals, in which one of the signals is generated through subtracting the L side input signal being amplified by a predetermined amplifying rate from the R side input signal then removing high frequency component from the remainder, and the other signal is generated through adding the L side input signal being amplified by a predetermined amplifying rate to the R side input signal, an L side output signal including a subtraction of signals, wherein the R side enhanced difference signal, being delayed to remove low and high ranges and amplified by a predetermined amplifying rate for a purpose of cross cancellation talk, is subtracted from the L side enhanced difference signal and an R side output signal including a subtraction of signals, wherein the L side enhanced difference signal, being delayed to remove low and high ranges and amplified by a predetermined amplifying rate for a purpose of cross cancellation talk, is subtracted from the R side enhanced difference signal.

An apparatus for processing sound signal according to the present invention comprises a difference signal enhancement part and crosstalk cancellation part, wherein the difference signal enhancement part includes a first amplifier which amplifies an L side input signal by a predetermined amplifying rate, a second amplifier which amplifies an R side input signal by a predetermined amplifying rate, a first subtracter which subtracts an output signal of the second amplifier from the L side input signal, a second subtracter which subtracts an output signal of the first amplifier from the R side input signal, a first low-pass filter which is connected to an output side of the first subtracter, a second low-pass filter which is connected to an output side of the second subtracter, a third amplifier which amplifies the L side input signal by a predetermined amplifying rate, a fourth amplifier which amplifies the R side input signal by a predetermined amplifying rate, a fifth amplifier which amplifies an output signal of the first low-pass filter by a predetermined amplifying rate, a sixth amplifier which amplifies an output signal of the second low-pass filter by a predetermined amplifying rate, a first adder which adds the L side input signal and an output signal of the fourth amplifier, a second adder which adds the R side input signal and an output signal of the third amplifier, a third adder which adds an output signal of the first adder and an output signal of the fifth amplifier and a fourth adder which adds an output signal of the second adder and an output signal of the sixth amplifier and wherein the crosstalk cancellation part includes a first delaying circuit which delays an output signal of the third adder, a second delaying circuit which delays an output signal of the fourth adder, a first band-pass filter which is connected to an output side of the first delaying circuit, and a second band-pass filter which is connected to an output side of the second delaying circuit, a seventh amplifier which amplifies an output signal of the first band-pass filter by a predetermined amplifying rate, a eighth amplifier which amplifies an output signal of the second band-pass filter by a predetermined amplifying rate, a third subtracter which subtracts an output signal of the eight amplifier from an output signal of the third adder and a fourth subtractor which subtracts an output signal of the seventh amplifier from an output signal of the fourth adder.

The apparatus for processing sound signal according to the invention is further characterized in that wherein a gain of the first and second amplifiers is 0.75 to 1, a gain of the third and fourth amplifiers is 0 to 0.5, a gain of the fifth and sixth amplifiers is 0 to 2.0, a gain of the seventh and eighth amplifiers is 0 to 0.5, delay time of the first and second delaying circuits is substantially lower than 0.1 ms (however, 0 is not included), a cut-off frequency of the first and second low-pass filters is substantially 7 KHz to 11 KHz, a cut-off frequency of low range side of the first and second band-pass filters is substantially 100 Hz to 300 Hz and a cut-off frequency of high range side of the first and second band-pass filters is substantially 7 KHz to 11 KHz.

According to the present invention, there is generated an L side enhanced difference signal which is an enhanced L−R signal being generated through adding the L−R signal being attenuated high frequency component to the L+R signal. Also, there is generated an R side enhanced difference signal which is an enhanced R−L signal being generated through adding the R−L signal being attenuated high frequency component to the R+L signal. Since L side enhanced difference signal and R side enhanced difference signal are respectively generated, the localized position of the sound image can be clear.

A signal, in which the R side enhanced difference signal is delayed and high frequency and low frequency are removed, is subtracted from the L side enhanced difference signal. Therefore, a crosstalk cancellation component from R side speaker is cancelled by the L side speaker. Also, a signal, in which the L side enhanced difference signal is delayed and high frequency and low frequency are removed, is subtracted from the R side enhanced difference signal. Therefore, a crosstalk cancellation component from L side speaker is cancelled by the R side speaker. Accordingly, it is possible to reduce the disturbance of a phase frequency characteristic, and the localized position of the sound image can be clearly sensed at outside of two speakers. In addition, since the above-mentioned effects can be obtained by a simple arrangement, it is possible to attain the effects with small processing volume.

DETAILED DESCRIPTION

Figure 1:
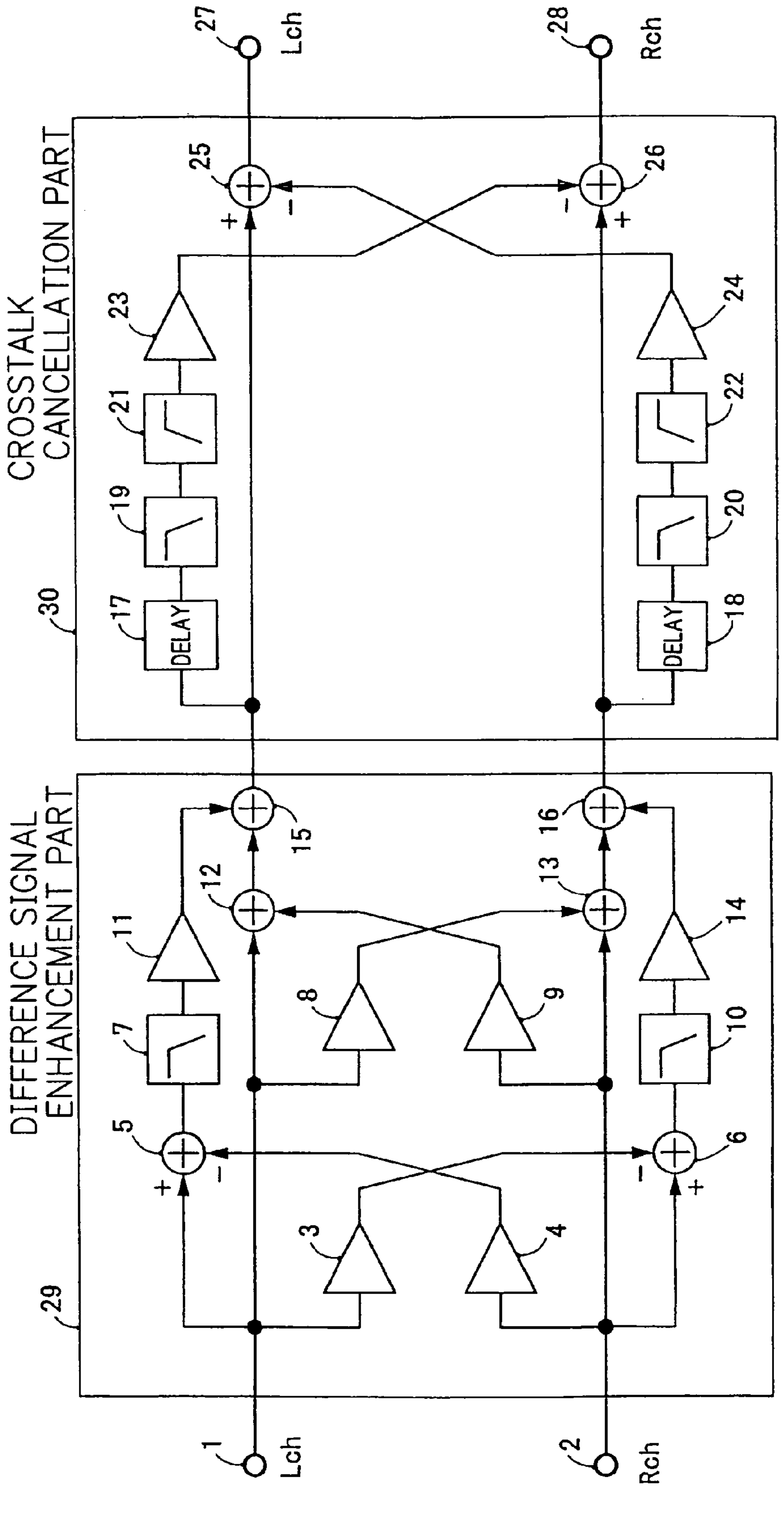
FIG. 1 is a circuit diagram of an apparatus for processing sound signal according to one Embodiment of the present invention.
Figure 2:
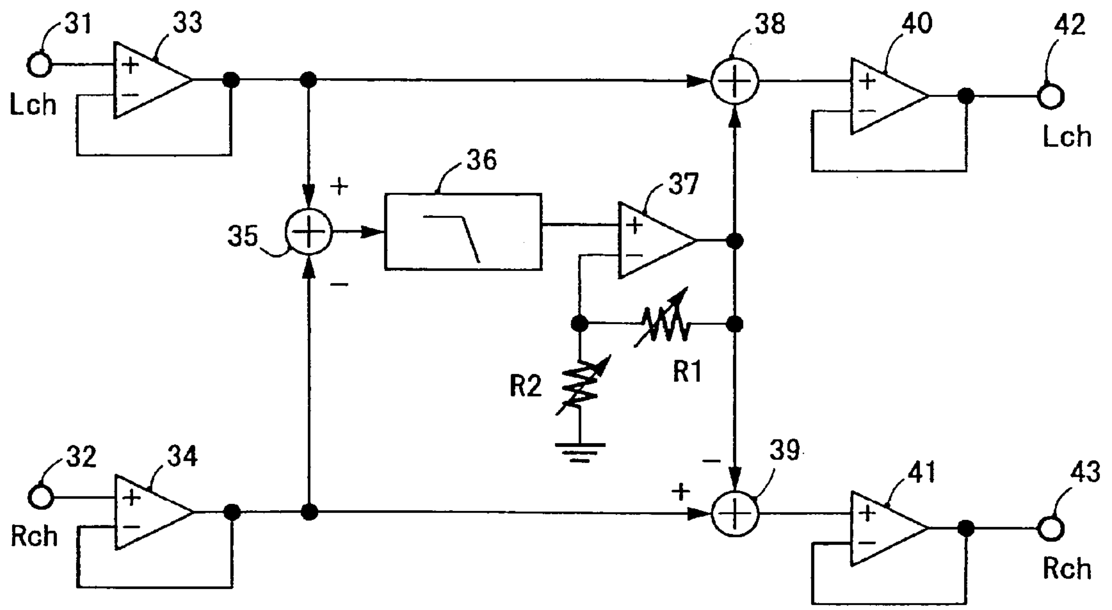
FIG. 2 is a circuit diagram of a conventional apparatus for processing sound signal.

In the present invention, an L side enhanced difference signal (a signal in which an L−R signal is added to an L side signal) based on the L−R signal, which is a component of difference signal of L signal and R signal, and an R side enhanced difference signal (a signal in which an R−L signal is added to an R side signal) based on an R−L signal, which is a component of difference signal of R signal and L signal, are respectively generated at a difference signal enhancement part.

At the difference signal enhancement part, a sound image localization becomes clear even if a synthetic signal of L signal and R signal is used as an enhancement component through setting the R signal component as L≧R by setting that a gain of R signal can be modulated within a range of 0.75 to 1.0 when generating the L−R signal. Also with respect to an R−L signal, a sound image localization becomes clear even if a synthetic signal of R signal and L signal is used as an enhancement component through setting the L signal component as L≦R through setting that a gain of L signal can be modulated within a range of 0.75 to 1.0 when generating the R−L signal in the same manner as to the L−R signal. The components of L−R signal and R−L signal are mainly high frequency components such as echo sound, and vocal component is scarcely included.

In addition, in the high frequency component of L−R signal and R−L signal, since there is included a signal component which is recognized as harsh, the signal component is removed by a low-pass filter. The size of enhanced component to be added can be modulated through setting that the gain of an output signal for the low-pass filter can be modulated within a range of 0 to 2.0. The low-pass filter can be in a range substantially between 7 KHz and 11 KHz of cut-off frequency.

In addition, an L+R signal and R+L signal, which are the sum of the L signal and R signal, are generated. Since vocal component is scarcely included in the enhancement component of L−R signal and R−L signal, it becomes an object to prevent sound from skipping when the enhancement component is added to the original sound. The gain of L>R is obtained by modulating the gain of R signal within a range of 0 to 0.5 when L+R signal is generated, and the gain of L<R is obtained by modulating the gain of L signal within a range of 0 to 0.5 when R+L signal is generated.

The L side enhanced difference signal and the R side enhanced difference signal are formed through adding the L+R signal and R+L signal for preventing from skipping to L−R signal to R−L signal for enhancement the difference signal. Then, the localized position for the sound image is clarified. Accordingly as mentioned above, the clear localized position for the sound image can be obtained while input signal is enhanced.

At a crosstalk cancellation part, the L side enhanced difference signal, which is the sum of L−R signal and L+R signal, is an L side input signal of the crosstalk cancellation part, and the R side enhanced difference signal, which is the sum of R−L signal and R+L signal, is an R side input signal of the crosstalk cancellation part.

A phase is dislocated through making the R side enhanced difference signal to have a short delay time of less than 0.1 ms (however, it is not 0). The signal component is corrected by passing the signal through the low-pass filter for preventing attenuation of high frequency side at the L signal side and through the high-pass filter for preventing attenuation of low frequency side at the L signal side (in other words, passing through a band-pass filter). Then, a crosstalk component for the R side, which is generated at the position of output (sound field) from the speaker, is removed through inverting the signal to the inverted component and adding it to the L side input signal.

A phase is dislocated through making the L side enhanced difference signal to have a short delay time of less than 0.1 ms (however, it is not 0). The signal component is corrected by passing the signal through the low-pass filter for preventing attenuation of high frequency side at the R signal side and through the high-pass filter for preventing attenuation of low frequency side at the R signal side (in other words, passing through a band-pass filter). Then, a crosstalk component for the L side, which is generated at the position of output (sound field) from the speaker, is removed through inverting the signal to the inverted component and adding it to the R side input signal.

Through setting the delay time to be less than 0.1 ms as mentioned above, there can be obtained a sufficient effect even if the distance between two speakers for output is narrow. Since the sound image is localized in a head when the gain is more than 0.5, the gain of a signal, which is delayed less than 0.1 ms, is to be within a range of 0 to 0.5.

Thus, the localized position of the sound image is clarified through intensifying the input signal at the difference signal enhancement part. Furthermore, the disturbance of the phase frequency characteristic is reduced by the crosstalk cancellation part, and the localized position of the sound image is clearly sensed at outside of two speakers.

Embodiment

FIG. 1 shows one Embodiment of the present invention. Numeral 1 is an L signal input terminal, numeral 2 is an R signal input terminal, numerals 3 and 4 are operational amplifiers having amplifying rate of 0.75 to 1, numerals 5 and 6 are substracters, numerals 7 and 10 are low-pass filters having cut-off frequencies between substantially 7 KHz to 11 KHz, numerals 8 and 9 are operational amplifiers having amplifying rate of 0 to 0.5, numerals 11 and 14 are operational amplifiers having amplifying rate of 0 to 2.0, numerals 12 and 13 are adders and numerals 15 and 16 are adders. A difference signal enhancement part 29 includes above-mentioned components.

Numerals 17 and 18 are delaying circuits having delay time of substantially below 0.1 ms (however, it is not 0), numerals 19 and 20 are low-pass filters having cut-off frequencies of substantially 7 KHz to 11 KHz, numerals 21 and 22 are high-pass filters having cut-off frequencies of substantially 100 Hz to 300 Hz, numerals 23 and 24 are operational amplifiers having amplifying rate of 0 to 0.5, numerals 25 and 26 are substracters, numeral 27 is an L signal output terminal and numeral 28 is an R signal output terminal. A crosstalk cancellation part 30 includes above-mentioned components. Through a low-pass filter 19 and a high-pass filter 21, and a low-pass filter 20 and a high-pass filter 22, band pass filters are respectively composed.

Signal from the L signal input terminal 1 and signal from R signal input terminal 2, whose gain is modulated within a range of 0.75 to 1.0 through an operational amplifier 4, are subtracted by the subtracter 5. The L−R signal, which is an output signal of the subtracter 5, is inputted into the low-pass filter 7 to remove harsh high frequency component, and the gain of the output signal is modulated by the operational amplifier 11. In addition, signal from the L signal input terminal 1 and signal from the R signal input terminal 2 in which gain is modulated within a range of 0 to 0.5 by the operational amplifier 9 are added by the adder 12. Signal, which is the sum of the output signal from the adder 12 and output signal from the operational amplifier 11 by the adder 15, is to be the L side enhanced difference signal of the difference signal enhancement part 29, in other words, it is the L side input signal of the crosstalk cancellation part 30.

In addition, signal from the R signal input terminal 2 and signal from L signal input terminal 1, whose gain is modulated within a range of 0.75 to 1.0 by an operational amplifier 3, are subtracted by the subtracter 6. The R−L signal, which is an output signal of the subtracter 6, is inputted into the low-pass filter 10 to remove harsh high frequency component, and the gain of the output signal is modulated by the operational amplifier 14. In addition, signal from the R signal input terminal 2 and signal from the L signal input terminal 1 in which gain is modulated within a range of 0 to 0.5 by the operational amplifier 8 are added by the adder 13. Signal, which is the sum of the output signal from the adder 13 and output signal from the operational amplifier 14 by the adder 16, is to be the R side enhanced difference signal of the difference signal enhancement part 29, in other words, it is the R side input signal of the crosstalk cancellation part 30.

The output signal of the adder 15 is inputted into the delaying circuit 17, and the output signal of the delaying circuit 17 is inputted into the low-pass filter 19. The output signal from the low-pass filter 19 is inputted into the high-pass filter 21, and the gain of the output signal is modulated by the operational amplifier 23. The gain of the modulated signal is subtracted from the output signal of the adder 16 by the subtracter 26, and the output signal becomes the output signal of the R side output terminal 28.

In addition, the output signal of the adder 16 is inputted into the delaying circuit 18, and the output signal of the delaying circuit 18 is inputted into the low-pass filter 20. The output signal from the low-pass filter 20 is inputted into the high-pass filter 22, and the gain of the output signal is modulated by the operational amplifier 24. The gain of the modulated signal is subtracted from the output signal of the adder 15 by the subtracter 25, and the output signal becomes the output signal of the L side output terminal 27.

What is claimed is:

1. A method for processing sound signal comprising:

an L side enhanced difference signal comprising a sum of signals, in which one of the signals is generated through subtracting an R side input signal being amplified by a predetermined amplifying rate from an L side input signal then removing the high frequency component from remainder, and the other signal is generated through adding said R side input signal being amplified by a predetermined amplifying rate to said L side input signal;

an R side enhanced difference signal comprising a sum of signals, in which one of the signals is generated through subtracting said L side input signal being amplified by a predetermined amplifying rate from said R side input signal then removing the high frequency component from the remainder, and the other signal is generated through adding said L side input signal being amplified by a predetermined amplifying rate to said R side input signal;

an L side output signal comprising a subtraction of signals, wherein said R side enhanced difference signal, being delayed to remove low and high ranges and amplified by a predetermined amplifying rate for a purpose of cross cancellation talk, is subtracted from said L side enhanced difference signal; and an R side output signal comprising a subtraction of signals, wherein said L side enhanced difference signal, being delayed to remove low and high ranges and amplified by a predetermined amplifying rate for a purpose of cross cancellation talk, is subtracted from said R side enhanced difference signal.

2. An apparatus for processing sound signal comprising:

a difference signal enhancement part and a crosstalk cancellation part;

wherein said difference signal enhancement part comprises a first amplifier which amplifies an L side input signal by a predetermined amplifying rate, a second amplifier which amplifies an R side input signal by a predetermined amplifying rate, a first subtracter which subtracts an output signal of said second amplifier from said L side input signal, a second subtracter which subtracts an output signal of said first amplifier from said R side input signal, a first low-pass filter which is connected to an output side of said first subtracter, a second low-pass filter which is connected to an output side of said second subtracter, a third amplifier which amplifies said L side input signal by a predetermined amplifying rate, a fourth amplifier which amplifies said R side input signal by a predetermined amplifying rate, a fifth amplifier which amplifies an output signal of said first low-pass filter by a predetermined amplifying rate, a sixth amplifier which amplifies an output signal of said second low-pass filter by a predetermined amplifying rate, a first adder which adds said L side input signal and an output signal of said fourth amplifier, a second adder which adds said R side input signal and an output signal of said third amplifier, a third adder which adds an output signal of said first adder and an output signal of said fifth amplifier and a fourth adder which adds an output signal of said second adder and an output signal of said sixth amplifier;

wherein said crosstalk cancellation part comprises a first delaying circuit which delays an output signal of said third adder, a second delaying circuit which delays an output signal of said fourth adder, a first band-pass filter which is connected to an output side of said first delaying circuit, and a second band-pass filter which is connected to an output side of said second delaying circuit, a seventh amplifier which amplifies an output signal of said first band-pass filter by a predetermined amplifying rate, a eighth amplifier which amplifies an output signal of said second band-pass filter by a predetermined amplifying rate, a third subtracter which subtracts an output signal of said eight amplifier from an output signal of said third adder and a fourth subtracter which subtracts an output signal of said seventh amplifier from an output signal of said fourth adder.

3. An apparatus for processing sound signal of claim 2, wherein a gain of said first and second amplifiers is 0.75 to 1, a gain of said third and fourth amplifiers is 0 to 0.5, a gain of said fifth and sixth amplifiers is 0 to 2.0, a gain of said seventh and eighth amplifiers is 0 to 0.5, delay time of said first and second delaying circuits is greater than 0 and substantially lower than 0.1 ms, a cut-off frequency of said first and second low-pass filters is substantially 7 KHz to 11 KHz, a cut-off frequency of a low range side of said first and second band-pass filters is substantially 100 Hz to 300 Hz and a cut-off frequency of a high range side of said first and second band-pass filters is substantially 7 KHz to 11 KHz.

* * * * *